No. 12,199.

REISSUED FEB. 23, 1904.

W. L. STARKEY.

ADJUSTABLE SCHOOL DESK AND SEAT.

APPLICATION FILED JULY 28, 1903.

2 SHEETS—SHEET 1.

WITNESSES
A. T. Palmer
N. M. Kelso.

INVENTOR
Warren L. Starkey
By Richard P. Elliott
Attorney

No. 12,199. REISSUED FEB. 23, 1904.

W. L. STARKEY.

ADJUSTABLE SCHOOL DESK AND SEAT

APPLICATION FILED JULY 28, 1903.

2 SHEETS—SHEET 2.

WITNESSES
A. T. Palmer
H. M. Keler

INVENTOR
Warren L. Starkey
By Richard P. Elliott
Attorney

No. 12,199. Reissued February 23, 1904.

UNITED STATES PATENT OFFICE.

WARREN L. STARKEY, OF FLATBUSH, NEW YORK, ASSIGNOR, BY MESNE ASSIGNMENTS, TO AMERICAN SCHOOL FURNITURE COMPANY, A CORPORATION OF NEW JERSEY.

ADJUSTABLE SCHOOL DESK AND SEAT.

SPECIFICATION forming part of Reissued Letters Patent No. 12,199, dated February 23, 1904.

Original No. 556,565, dated March 17, 1896. Application for reissue filed July 23, 1903. Serial No. 167,361.

*To all whom it may concern:*

Be it known that I, WARREN L. STARKEY, a citizen of the United States, residing at No. 464 East Twenty-sixth street, Flatbush, Brooklyn, county of Kings, and State of New York, have invented certain new and useful Improvements in Adjustable School Desks and Seats; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My present invention relates to improvements in adjustable hygienic school desks and seats combined or separate and is an improvement on the United States Letters Patent, No. 537,081, granted to me on April 9, 1895.

The object of the invention is to provide an adjustable school desk and seat combined or separate of simple, strong, and durable construction, easily and quickly handled, adjusted, and operated.

A further object is to provide said adjustable school desk and seat with simple adjusting means operated from one side only and at the same time acting as locking and clamping mechanism.

The invention consists in the improved adjustable school desk and seat, in the peculiar construction of the seat, its relative arrangement, especially of the back, to the desk proper, in the means for adjusting and locking the desk and chair, respectively, and in the combination and arrangement of the various parts thereof, substantially as will be hereinafter more fully described, and finally embodied in the clauses of the claim.

Figure 2:
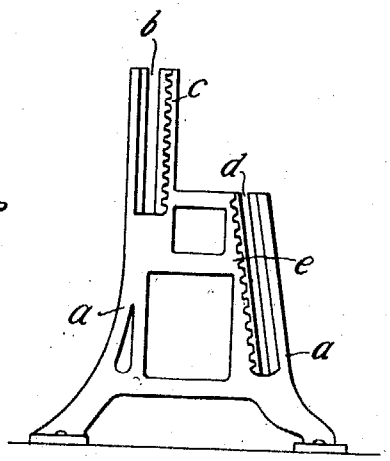
Figure 1:
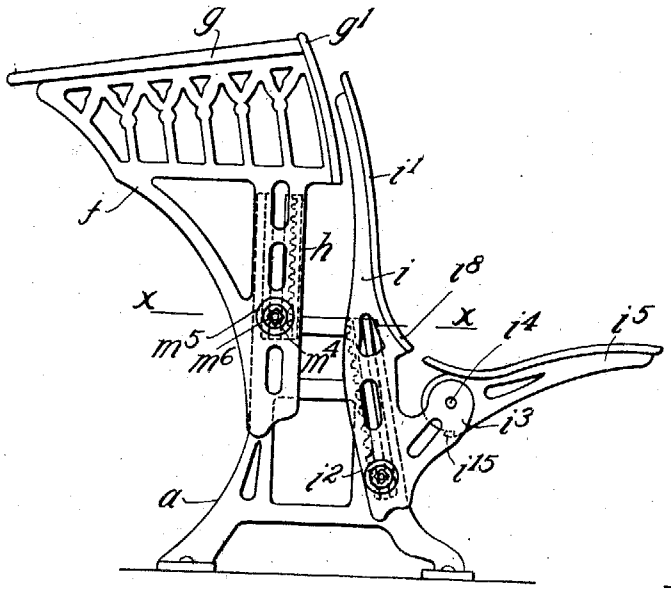
Figure 4:
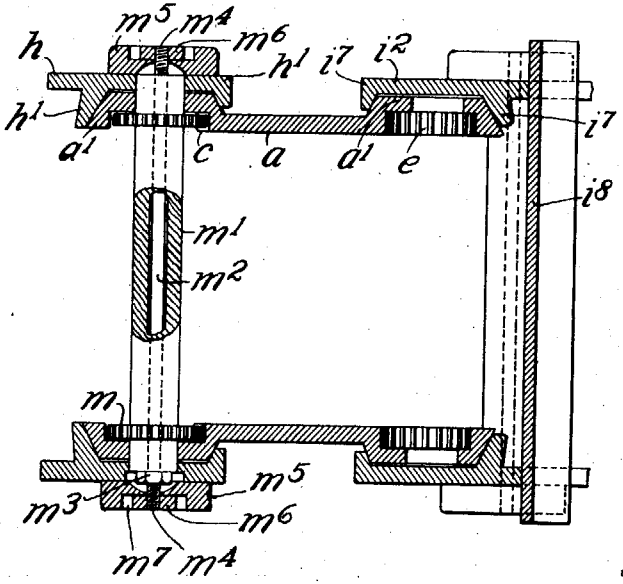
Figure 4A:
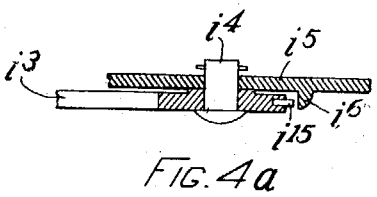
Figure 3:
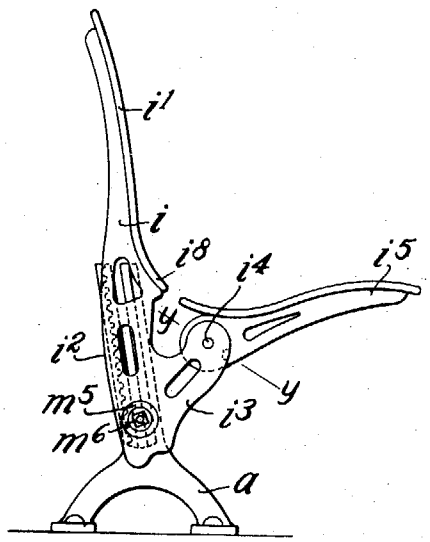

In the accompanying drawings, Figure 1 is a side elevation of a school desk and seat constructed in accordance with my invention; Fig. 2, a side elevation of one of the standards; Fig. 3, a side elevation of a chair or seat independent of the desk and provided with my improvement; Fig. 4, an enlarged sectional view on the line $x\,x$ of Fig. 1, and Fig. $4^a$ an enlarged detail sectional view on the line $y\,y$ of Fig. 3.

In said drawings, $a$ represents the leg or standard, provided at its upper end with an open-ended vertical slot $b$ and on one side thereof with an open-ended slot $d$, arranged at an acute angle to the slot $b$. The portion of the standard adjoining the said slots is flanged and wedge-shaped, as shown at $a'$ in Fig. 4. One of the side walls of each of said open-ended slots $b$ and $d$, preferably the inner wall, is provided with or formed into a rack-bar $c$ and $e$, respectively, as clearly shown in Fig. 2, for a purpose hereinafter specified.

The desk $f$, with top $g$ and back $g'$, is provided with depending arms $h$, which pass down on the outer sides of the standards or legs $a$. Said arms are provided with inwardly-projecting flanges $h'$, having wedge-shaped inner walls, and are adapted to engage and bear against the wedge-shaped flanges of the legs $a$, as clearly shown in Fig. 4. The two arms $h$ of the desk are held together by a connecting-rod $m^2$, the threaded ends $m^4$ of which are engaged by the knobs $m^5$. The said rod passes through the hollow shaft $m'$, journaled in the arms $h$ and extending to about the outer faces thereof. A blind nut $m^3$ is arranged on one end of the rod $m^2$ and is secured to the end of the hollow shaft $m'$. The knobs $m^5$, which are hollow, so as not come in contact with the ends of the hollow shaft and the blind nut, respectively, are each provided with a groove or recess $m^7$, and centrally formed therein is a nut $m^6$, the outer face of which is substantially in a plane with the outer face of the knob and is adapted to be engaged by a wrench or key in the operation of the device.

Near the ends of the hollow shaft $m'$ are secured in any desired manner the pinions $m$, which engage the rack-bars $c$, as clearly shown, so that when the shaft is rotated the pinions are caused to move over the rack-bars, and the desk is thereby adjusted vertically.

The seat $i$, as preferred, is provided with a single or double curved back $i^3$ and $i'$ and is made in one piece or in sections, but is entirely independent from the back $g'$ of the desk, as clearly shown in Fig. 1 of the drawings, by which arrangement any movement or vibration of the back $i'$ is not transmitted to the desk, and thus not felt by the pupil using the same.

The seat $i$ is provided with depending arms $i^2$, which pass down on the outer sides of the standards or legs $a$. Said arms $i^2$ are provided with inwardly-projecting flanges $i^7$, having wedge-shaped inner walls, and are adapted to engage and bear against the wedge-shaped flanges $a'$ of the legs $a$, as clearly shown in Fig. 4. The arm $i^3$, projecting from arm $i^2$, forms the bearing for the shaft or bolt $i^4$, on which the seat proper, $i^6$, is fulcrumed. On the inside of the arm $i^3$ is arranged a block or pad $i^{15}$, made of felt, rubber, or any other suitable elastic material, adapted to be engaged by the edge of the frame supporting the seat $i^6$, as in Fig. 1, or the block or pad $i^{15}$ is inserted in the edge of the arm $i^3$ and is adapted to be engaged by a pin $i^8$, projecting from the side of the seat-supporting frame, as in Figs. 3 and 4*, for the purpose of deadening the sound when the seat is folded or turned down for use.

The adjusting and clamping device for the seat and its arms, respectively, is the same as the one above described in connection with the desk $f$ and its depending arms $h$—viz., rod $m'$, blind nut $m^3$, knobs $m^5$, hollow shaft $m^2$, and pinions $m$, the latter engaging the rack-bars $e$, as will be manifest.

In the construction illustrated in Fig. 3 the seat is made independent of the desk and is adjustably arranged on separate standards or legs $a$, as clearly shown, and can as such be used for schools, halls, theaters, &c., as will be manifest. It is clear from Fig. 1 that as the desk and seat are adjusted entirely independently said desk may also be made separate from the seat. The main object remains the same—that is to say, the seat is adjusted and clamped from one side only and by the same adjusting and clamping mechanism.

The operation of the device is thought to be obvious. By simply removing the knob $m^5$ and turning the blind nut $m^3$ by a crank-handle the desk or seat can be lowered or raised. When adjusted to the height required, the knob $m^5$ is put on the screw-threaded end $m^4$ of the rod $m^2$ and is operated, thus drawing the depending arms $h$ or $i^2$ together and with their inner wedge-shaped flanges against the legs of standards $a$, the latter binding on the pinions, and thus prevent their rotation. For a quicker adjustment the knob $m^5$ is merely loosened and the desk or seat raised or lowered by hand, (the pinions will operate on the rack-bars,) and when the required height is obtained the knob is again tightened.

In providing the slot $d$ at an acute angle to the slot $b$ the space between the seat and the "desk in front of said seat" is increased or decreased when the seat is raised or lowered in substantially the same proportion as the height of the seat is increased or decreased, and this a very important feature of my invention, as it is apparent that the taller the pupil occupying the seat the more space is needed by him.

From the foregoing it can be seen that the connecting-rods do not serve alone for the purpose of holding the depending desk or seat-arms together and to support the "pinions carrying hollow shafts," but that they also serve, in connection with the nuts on their threaded ends, to bind or clamp the depending arms against the legs or standards and the latter against the pinions and that the adjusting and clamping is performed from one side only.

I do not intend to limit myself to the precise construction shown and described, as various alterations can be made without changing the scope of my invention; but

What I claim as new, and desire to secure by Letters Patent, is—

1. An adjustable desk and seat combined, consisting of two sets of legs or standards, of the desk proper, vertically adjustable on said standards, a back to said desk, a seat adjustably arranged on said standards and movable at an acute angle to the desk to increase or decrease the distance between said seat and a desk placed in front of it, and a back forming part of the seat, said back being independent of the back of the desk behind it and clearing the same, substantially as and for the purposes described.

2. An adjustable desk and seat combined, consisting of two sets of legs or standards, of the desk proper vertically adjustable on said standards, a back to said desk, a seat adjustably arranged on said standards and movable at an acute angle to the desk to increase or decrease the distance between said seat and a desk placed in front of it, a back, forming part of the seat, being independent of the back of the desk behind it, and means for adjusting the desk and seat independently of each other, substantially as and for the purposes described.

3. An adjustable desk and seat combined, consisting of two sets of legs or standards, each standard being provided with a vertical slot, a rack-bar on one side of said slot, the desk proper provided with a back and having on each side a depending arm engaging the legs or standards, a rod passing through said arms and provided with screw-threaded ends, a blind nut on one end of said rod, a clamping-nut on each end of said rod, a hollow shaft on said rod and secured with one end to the blind nut, a pinion secured near each end of said hollow shaft and engaging its respective rack-bar, a seat adjustably arranged on the standards and movable at an acute angle to the desk to increase or decrease the distance between said seat and a desk placed in front of it, and having a back independent of the back of the desk behind it and clearing the same, and means for locking said seat on the standards, substantially as and for the purposes described.

4. An adjustable desk and seat combined, consisting of two sets of legs or standards, each standard being provided with a vertical slot and with a slot at an acute angle to the vertical slot, a desk adjustably arranged in said vertical slot, and provided with a back, a seat adjustably arranged in the other slot and adapted to be moved in a plane at an acute angle to the desk to increase or decrease the distance between said seat and a desk placed in front of it, a back forming part of said seat, said back being independent of the back of the desk behind it, and clearing the same, and means for adjustably securing the desk and seat independently of each other, substantially as and for the purposes described.

5. An adjustable desk and seat combined, consisting of two sets of legs or standards, each standard being provided with a vertical slot and with a slot at an acute angle to the vertical slot and having wedge-shaped outer sides, a rack-bar on one side of each slot, a desk provided with a back and having depending arms, each of said arms having inwardly-extending wedge-shaped flanges adapted to engage the wedge-shaped sides of the standards, a horizontally-arranged rod connecting said depending arms of the desk, clamping-nuts on the outer ends of said rod, a hollow shaft on said rod, a pinion on each end of said hollow shaft and engaging the rack-bars of the vertical slot, a seat provided with a back independent of the back of the desk and having on each side a depending arm with inwardly-projecting wedge-shaped flanges adapted to engage the wedge-shaped outer sides of the standards (on each side of the inclined slot), a rod connecting the depending arms of the seat, clamping-nuts on each end of the rod, a hollow shaft on said rod and a pinion on each end of the hollow shaft and engaging the rack-bars of the inclined slot, all said parts, substantially as and for the purposes described.

6. In an adjustable desk, the combination with the legs or standards, each provided with a slot, of a rack-bar on one side of said slot, the desk proper having depending arms adapted to bear against the legs or standards, a rod connecting said arms and provided with screw-threaded ends, a hollow clamping-nut on each of said ends, a hollow shaft on the rod, and a pinion on each end of the hollow shaft and engaging the rack-bars of the slots; and adapted to bear against the legs or standards, when the clamping-nuts are tightened, all said parts, substantially as and for the purposes described.

7. In an adjustable desk, the combination with the legs or standards, each provided with a slot, of a rack-bar on one side of said slot, the desk proper having depending arms adapted to bear against the legs or standards, a rod connecting said arms and provided with screw-threaded ends, a hollow shaft on said rod, a blind nut on one end of said rod and secured to said hollow shaft, a pinion on each end of said hollow shaft and engaging the rack-bars of the slot and adapted to bear against the legs or standards, and a hollow clamping-nut on each end of the rod and bearing against the outer faces of the depending arms, all said parts, substantially as and for the purposes described.

In testimony whereof I have hereunto set my hand, in the presence of two subscribing witnesses, this the 27th day of June, 1903.

WARREN L. STARKEY.

Witnesses:

CHARLES E. DIXON,
W. B. GUNNISON.